(12) United States Patent
Kishida et al.

(10) Patent No.: US 10,620,019 B2
(45) Date of Patent: Apr. 14, 2020

(54) RAYLEIGH MEASUREMENT SYSTEM AND RAYLEIGH MEASUREMENT METHOD

(71) Applicant: Neubrex Co., Ltd., Kobe-shi, Hyogo (JP)

(72) Inventors: Kinzo Kishida, Kobe (JP); Yoshiaki Yamauchi, Kobe (JP)

(73) Assignee: NEUBREX CO., LTD., Kobe-Shi, Hyogo (JP)

(*) Notice: Subject to any disclaimer, the term of this patent is extended or adjusted under 35 U.S.C. 154(b) by 39 days.

(21) Appl. No.: 16/078,533

(22) PCT Filed: Mar. 11, 2016

(86) PCT No.: PCT/JP2016/057716
§ 371 (c)(1),
(2) Date: Aug. 21, 2018

(87) PCT Pub. No.: WO2017/154190
PCT Pub. Date: Sep. 14, 2017

(65) Prior Publication Data
US 2019/0049273 A1    Feb. 14, 2019

(51) Int. Cl.
*G01D 5/353* (2006.01)
*G01B 11/16* (2006.01)
*G01K 11/32* (2006.01)

(52) U.S. Cl.
CPC ........ *G01D 5/35361* (2013.01); *G01B 11/16* (2013.01); *G01B 11/18* (2013.01); *G01K 11/32* (2013.01)

(58) Field of Classification Search
CPC ........... G01D 5/35361; G01D 5/35358; G01D 5/35354; G01D 5/35338; G01D 5/353; G01B 11/16; G01B 11/18; G01K 11/32
See application file for complete search history.

(56) References Cited

U.S. PATENT DOCUMENTS

| 6,380,534 B1 | 4/2002 | Farhadiroushan et al. |
| 7,440,087 B2 | 10/2008 | Froggatt et al. |
| 2003/0234921 A1 | 12/2003 | Yamate et al. |

(Continued)

FOREIGN PATENT DOCUMENTS

| JP | 2001-507446 A | 6/2001 |
| JP | 2004-069685 A | 3/2004 |

(Continued)

OTHER PUBLICATIONS

International Search Report (PCT/ISA/210) dated Jun. 7, 2016, by the Japan Patent Office as the International Searching Authority for International Application No. PCT/JP2016/057716.

(Continued)

*Primary Examiner* — John R Lee
(74) *Attorney, Agent, or Firm* — Buchanan Ingersoll & Rooney PC

(57) ABSTRACT

Initial data and target data are frequency-analyzed to obtain an initial Rayleigh-scattering spectrum (RSS) and a target RSS, respectively. A distance correction is performed for the target RSS by comparing the target RSS with the initial RSS, and a Rayleigh spectrum shift is determined on the basis of a correlation coefficient between the initial RSS and the target RSS after distance-corrected.

6 Claims, 13 Drawing Sheets

(56) References Cited

U.S. PATENT DOCUMENTS

| | | | |
|---|---|---|---|
| 2010/0312512 A1* | 12/2010 | Ajgaonkar | G01K 11/32 702/99 |
| 2011/0228255 A1 | 9/2011 | Li et al. | |
| 2015/0211900 A1* | 7/2015 | Xue | G01K 11/32 356/73.1 |
| 2019/0049273 A1* | 2/2019 | Kinzo | G01D 5/35361 |

FOREIGN PATENT DOCUMENTS

| | | |
|---|---|---|
| JP | 4441624 B2 | 3/2010 |
| JP | 2011-017652 A | 1/2011 |
| WO | WO 2010/61718 A | 6/2010 |

OTHER PUBLICATIONS

Written Opinion (PCT/ISA/237) dated Jun. 7, 2016, by the Japan Patent Office as the International Searching Authority for International Application No. PCT/JP2016/057716.

"Luna Optical Distributed Sensor Interrogator (Models ODiSI A10 and A50)", URL: http://lunainc.com/wp-content/uploads/2012/11/LT_DS_ODISI-A_Data-Sheet_Rev-07.pdf.

Kinzo Kishida, Yoshiaki Yamauchi, and Artur Guzik, "Study of Optical Fibers Strain-Temperature Sensitivities Using Hybrid Brillouin-Rayleigh System", Photonic Sensors, DOI : 10.1007/s13320-013-0136-1 (2013).

\* cited by examiner

RAYLEIGH MEASUREMENT SYSTEM AND RAYLEIGH MEASUREMENT METHOD

TECHNICAL FIELD

The present invention relates to a technology of measuring with high accuracy a distribution such as of strain and temperature along a distance more than several hundred meters by utilizing Rayleigh backscattering of laser light entered into an optical fiber.

BACKGROUND ART

There is known a conventional method of measuring a distribution of strain or temperature in the longitudinal direction of an optical fiber by means of Rayleigh backscattering light (hereinafter, abbreviated as Rayleigh scattering light) of tunable laser light pulses launched into the optical fiber and using relationships between the variation amounts of strain, temperature, the scattering light from the optical fiber and a correlation peak frequency of the scattering light received from each longitudinal position of the optical fiber (see, for example, Patent Document 1).

Further, there is another technique in which both reference data and target data from a measurement target are measured and a correlation analysis for calculating in the frequency domain a correlation between these data is performed, to obtained a Rayleigh spectrum shift (see, for example, Patent Document 2).

Furthermore, there is also a hybrid measurement technique for sophisticating the measurement utilizing Rayleigh scattering, in which a position or a distance to the position of measurement data obtained by Rayleigh scattering is corrected using combination of measurement data obtained from Brillouin scattering in addition to the Rayleigh scattering (see, for example, Non-Patent Document 1).

PRIOR ART DOCUMENT

Patent Documents

Patent Document 1: JP 4,441,624 B2
Patent Document 2: U.S. Pat. No. 7,440,087 B2

Non-Patent Documents

Non-Patent Document 1: Kinzo KISHIDA, Yoshiaki YAMAUCHI, and Artur GUZIK, "Study of Optical Fibers Strain-Temperature Sensitivities Using Hybrid Brillouin-Rayleigh System", Photonic Sensors, DOI: 10.1007/s13320-013-0136-1, 2013
Non-Patent Document 2: LUNA "OPTICAL DISTRIBUTED SENSOR INTERROGATOR (Models ODiSI A10 and A50)", URL: http://lunainc.com/wp-content/uploads/2012/11/LT_DS_ODiSI-A_D ata-Sheet_Rev-07.pdf (Search Date: 6 Jan. 2016)

SUMMARY OF THE INVENTION

Problem that the Invention is to Solve

However, in calculating in the Rayleigh scattering frequency domain a correlation between reference initial data and target data from a measurement target, it is revealed that using in the measurement an optical fiber having a long length more than several hundred meters causes a distance deviation problem owing to deformation or temperature effect of the optical fiber. Specifically, while measured positions before and after the deformation deviate from each other in measuring a measurement target, using a long optical fiber in the Rayleigh scattering measurement cannot neglect influence of the above-described deviation of measured positions for a case with a large strain or temperature change of the measurement target. For that reason, in an existing measurement instruments employing the method of calculating in the Rayleigh scattering frequency domain a correlation between the above initial data and the target data, a measurable distance is at best 50 m (see, for example, Non-Patent Document 2). In a case of measuring a temperature distribution such as of oil well, however, the measurement range is almost more than several hundred meters long in actuality; hence, the methods disclosed in Patent Documents 1 and 2 are unusable in practice. Such being the situation, the above-described deviation of measured position needs to be corrected by some means for a case of such a long measurement range.

A hybrid measurement technique that uses combination of Brillouin scattering in addition to Rayleigh scattering is proposed as a method of correcting the deviation of a measured position (see, for example, Non-Patent Document 1). Using the hybrid measurement technique allows distance restriction on the measurement to be removed virtually even for a measurement range more than several hundred meters by correcting a position error contained in the target data using data obtained from the Brillouin scattering measurement. Unfortunately, not only the Rayleigh scattering but also the Brillouin scattering need to be used. Thus, it is difficult under the current state of the art to improve accuracy of measurement data obtained using the Rayleigh scattering alone in a case of a measurement range more than several hundred meters. Furthermore, while using the hybrid measurement technique allows the distance restriction on the measurement to be removed virtually, the present inventors recently revealed that there is a problem in the position correction, i.e., a problem in the correlation measurement used for correcting the position.

Firstly, an explanation is made below, with reference to the relevant figures, as to the problem with the correlation measurement using an existing hybrid measurement technique (measurement technique using combination of Brillouin scattering in addition to Rayleigh scattering), specifically, as to the revealed problem in the measurement technique in which reference initial data and target data from the measurement target are obtained and position correction is performed by means of correlation in the frequency domain between these data.

In this measurement method, first of all, an initial data measurement unit 11 measures initial data and a target data measurement unit 12 measures target data for correlating with the initial data, as shown in FIG. 1. Next, an initial Rayleigh-scattering spectrum analysis unit 13 and a target Rayleigh-scattering spectrum analysis unit 14 analyze the measured initial data and the measured target data, to obtain their respective Rayleigh scattering spectra (abbreviated as "RSS" hereinafter). Next, a distance correction unit 16 performs the distance correction of the target RSS obtained previously using the distance information, which is separately obtained from the Brillouin measurement and stored in a distance information storage unit 15. Then, a correlation analysis unit 17 calculates a correlation between the distance-corrected target RSS and the initial RSS, and a Rayleigh spectrum shift operation unit 18 determines a Rayleigh spectrum shift from the correlation result of the correlation analysis unit 17.

Unfortunately, it is revealed that this technique cannot, in some cases, perform properly the position correction using the distance information obtained from the Brillouin measurement. In the measurement example shown in FIG. 2, the position correction amounts corrected in wide regions pose problems such as in that the correction results are different depending on the region sizes (corresponding to the distances of "50 m", "100 m", and "200 m" indicated as the legends in FIG. 2; hereinafter, the region size is referred to as a correlative range) used in the correlation calculation, the correction amounts vary depending on positions, i.e., distances, and the correction amounts do not vary monotonically. Thus, this technique cannot be utilized for the position correction of the Rayleigh measurement data.

The present invention is made in light of the above problems and aimed at providing a system and a method that are capable of measuring distributions such as of strain and temperature of a measurement target with high accuracy using Rayleigh scattering alone without subject to the influence of the correlative range even in a case of a long measurement range more than several hundred meters.

Means for Solving the Problem

A Rayleigh measurement system configured to obtain a distribution of a physical quantity of an optical fiber, on the basis of Rayleigh backscattering light produced by launching optical pulses into the optical fiber, the Rayleigh measurement system comprising: an initial data measurement unit configured to measure Rayleigh backscattering light from the optical fiber, to obtain initial data as a reference for a distance correction; a target data measurement unit configured to measure Rayleigh backscattering light from the optical fiber, to obtain target data to be distance-corrected; an initial Rayleigh-scattering spectrum analysis unit configured to frequency-analyze the initial data measured with the initial data measurement unit, to obtain an initial Rayleigh-scattering spectrum; a target Rayleigh-scattering spectrum analysis unit configured to frequency-analyze the target data measured with the target data measurement unit, to obtain a target Rayleigh-scattering spectrum; a comparison-based distance correction unit configured to compare the initial Rayleigh-scattering spectrum obtained by the initial Rayleigh-scattering spectrum analysis unit with the target Rayleigh-scattering spectrum obtained by the target Rayleigh-scattering spectrum analysis unit, to correct distance error at a measurement position in the target Rayleigh-scattering spectrum obtained by the target Rayleigh-scattering spectrum analysis unit; a correlation analysis unit configured to perform a correlation analysis between the initial Rayleigh-scattering spectrum data obtained by the initial Rayleigh-scattering spectrum analysis unit and the target Rayleigh-scattering spectrum data whose distance error is corrected by the comparison-based distance correction unit; and a Rayleigh spectrum shift calculation unit configured to calculate a Rayleigh spectrum shift, on the basis of the data obtained by the correlation analysis unit, to determine a Rayleigh spectrum shift amount at the measurement position along the optical fiber.

A Rayleigh measurement method of obtaining a distribution of a physical quantity of an optical fiber, on the basis of Rayleigh scattering light produced by launching light pulses into the optical fiber, the Rayleigh measurement method comprising the steps of: analyzing initial data, which is a reference for a distance correction, of the Rayleigh backscattering light from the optical fiber, to obtain an initial Rayleigh-scattering spectrum; analyzing target data, which is to be distance-corrected, of Rayleigh backscattering light from the optical fiber, to obtain a target Rayleigh-scattering spectrum; performing distance correction of the target Rayleigh-scattering spectrum by comparing these two spectra; and performing correlation analysis between the distance-corrected spectrum and the initial Rayleigh-scattering spectrum, to determine a Rayleigh spectrum shift amount at a measurement position along the optical fiber.

Advantage Effect of the Invention

According to the present invention, a considerable effect is brought about that measurement of distributions such as of strain and temperature of a measurement target can be measured with high accuracy using Rayleigh scattering alone even in a case of a long measurement range more than several hundred meters.

EMBODIMENTS FOR CARRYING OUT THE INVENTION

Embodiment 1

Figure 2:
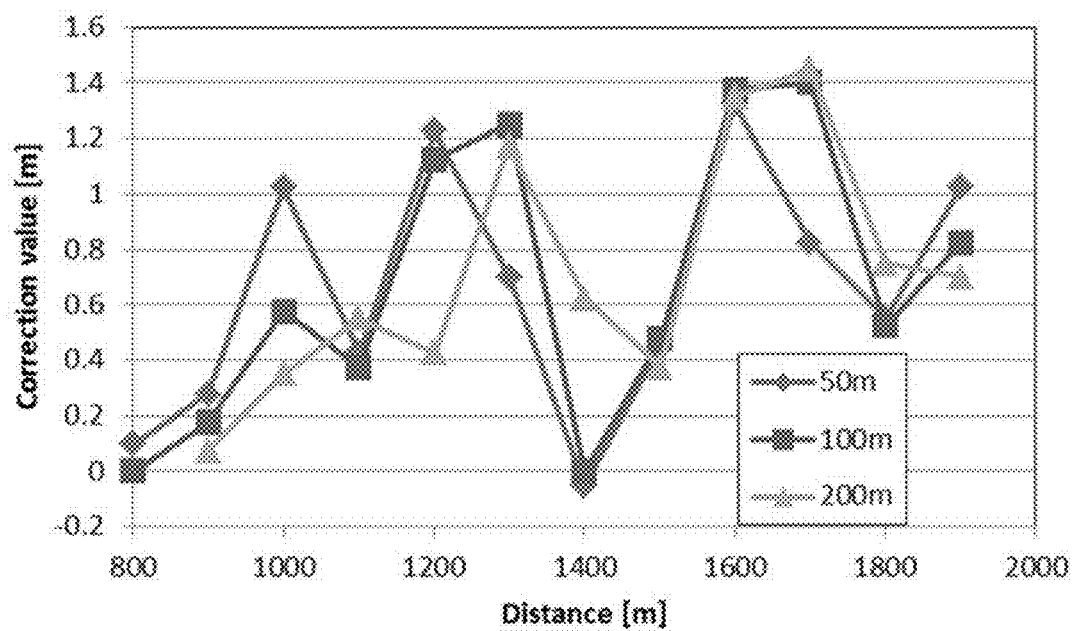
FIG. 2 is a graph for explaining a problem in the existing position (distance) correcting method for the target data measured by means of Rayleigh scattering.

Embodiment 1 of the present invention is described hereinafter with reference to the drawings. Before anything else, it is necessary to resolve the problem that the correction amount varies depending on the position, i.e., distance, as shown in FIG. 2. A method for resolving this problem is described with reference to the drawings.

Figure 1:
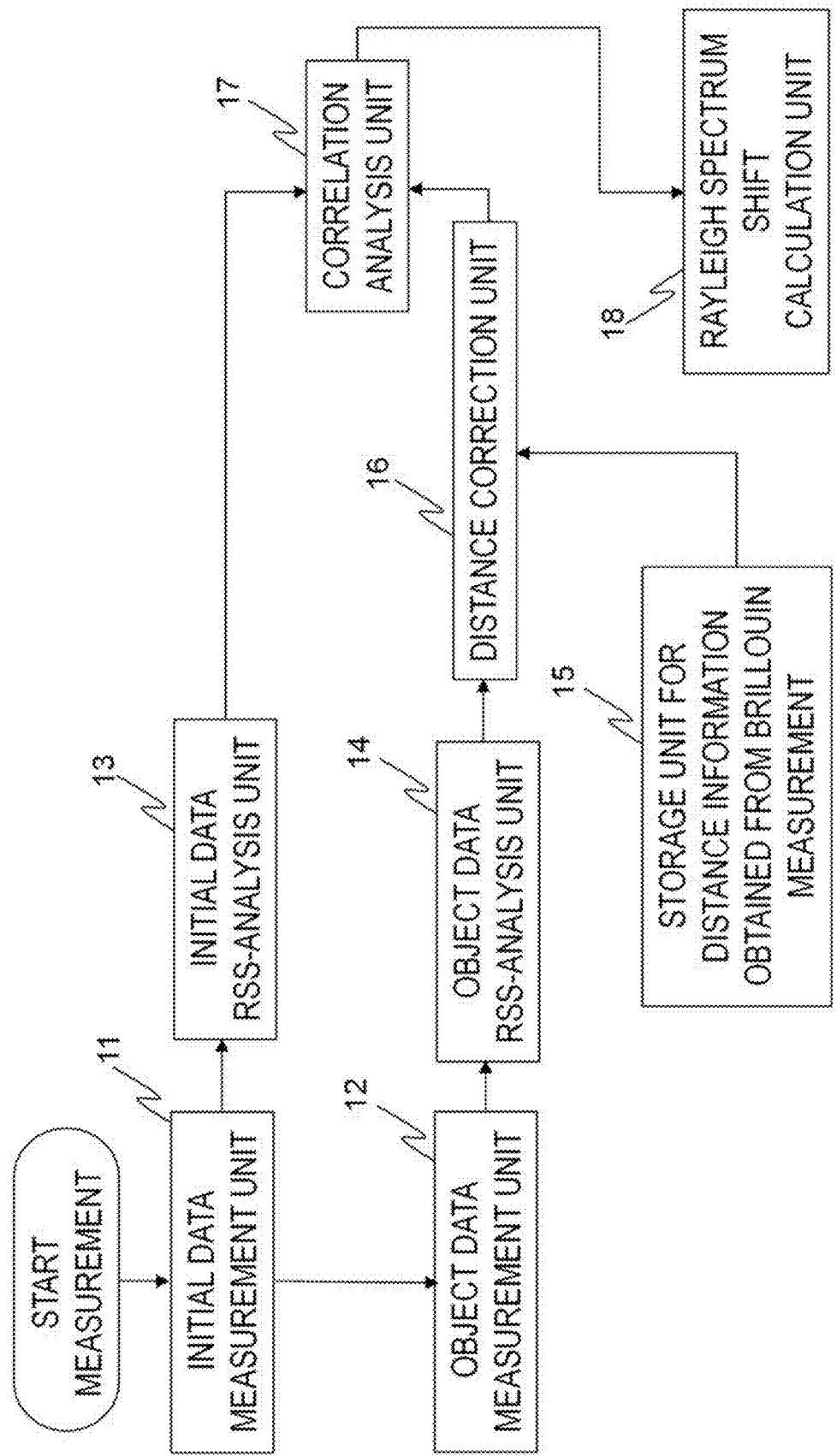
FIG. 1 is a block diagram showing an existing method of correcting a position (distance) of a target data measured by means of Rayleigh scattering.

While the system shown in FIG. 1 needs the distance information obtained from the Brillouin measurement to perform the distance correction of a target RSS, the system according to Embodiment 1 (see FIG. 3) performs a distance correction of the target RSS using data obtained from Rayleigh scattering alone without using Brillouin measurement, to determine a Rayleigh spectrum shift using an initial RSS and the distance-corrected target RSS. Specifically, in FIG. 3, an initial data measurement unit 1 measures initial data, which is a reference for the distance correction, and a target data measurement unit 2 measures target data to be distant-corrected, for comparison with the initial data. Next, an initial RSS analysis unit 3 frequency-analyzes the initial data measured with the initial data measurement unit 1 to obtain initial RSS data, and a target RSS analysis unit 4 frequency-analyzes the target data measured with the target data measurement unit 2 to obtain a target RSS data. Next, in order to correct a distance error in the target RSS data already obtained, a comparison-based distance correction unit 9 receives the initial RSS data and the target RSS data already obtained and calculates a distance correction amount by performing a correlation analysis for comparing these data, to obtain distance-corrected target RSS data. Then, a correlation analysis unit 7 performs a correlation analysis between the distance-corrected target RSS data and the initial data, and a Rayleigh spectrum shift calculation unit 8 calculates from the correlation analysis information the amount of Rayleigh spectrum shift at a measurement position. That is, the measurement system according to Embodiment 1 is configured to obtain the amount of Rayleigh spectrum shift using the distance-correction information obtained from the Rayleigh measurement alone without using distance-correction information obtained by the other method such as a Brillouin measurement method, compared to the system shown in FIG. 1. It is revealed that an appropriate frequency shift amount can be obtained if a distance of about 20 cm can be corrected as a target value. Hereinafter, the distance correction method is described in detail further with reference to the figures.

Figure 4:
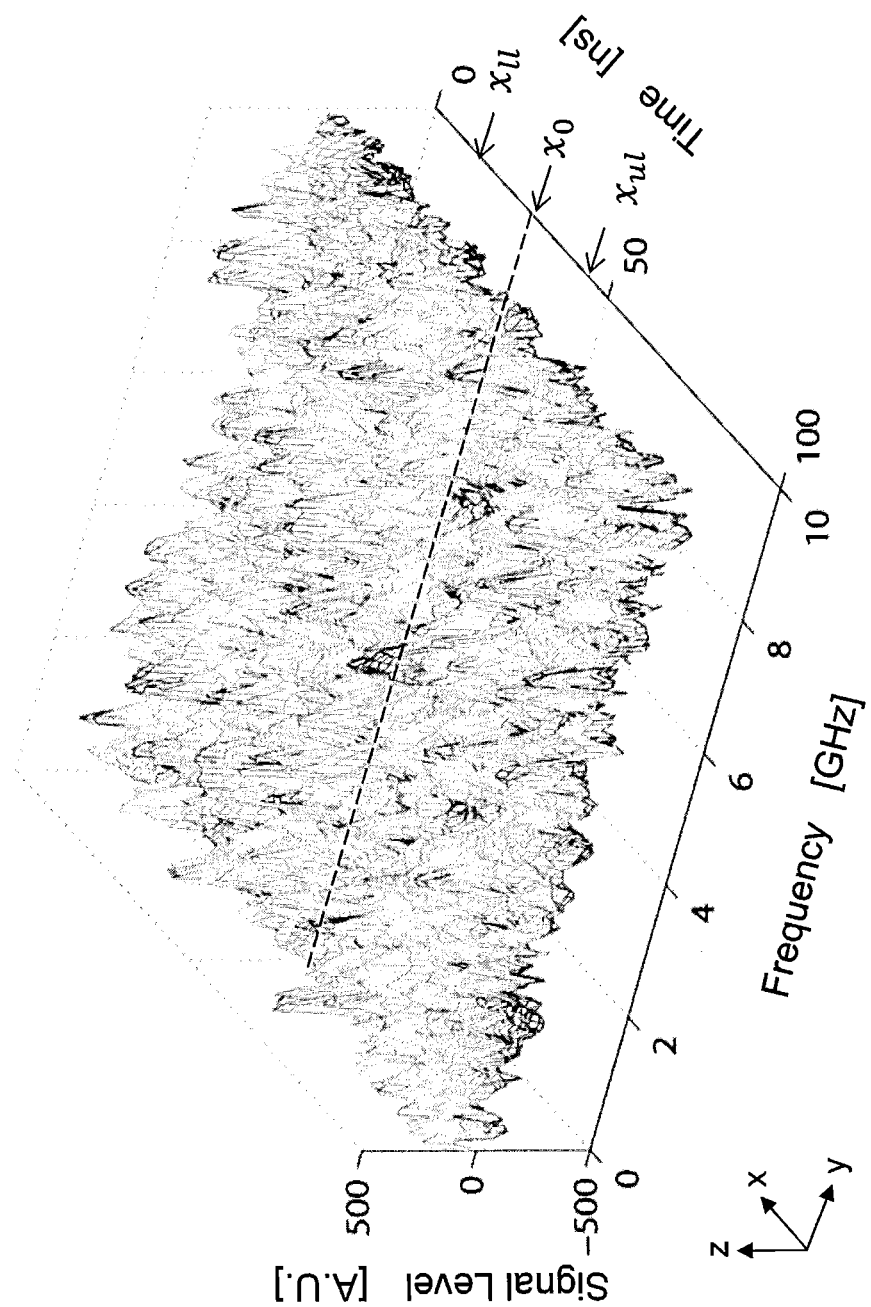
FIG. 4 is an actual measurement example showing a relation between a signal level, a space, and a frequency measured with the Rayleigh measurement system according to Embodiment 1 of the present invention.

FIG. 4 is an actual measurement example showing three-dimensionally a relation between a measured Rayleigh-scattering signal level, a space (a distance from a reference position), and frequency. In the figure, the x-axis represents time in units of nanosecond (ns), which corresponds to the distance from the reference position. Specifically, the time of one nanosecond corresponds to a distance of ten cm. The y-axis represents the frequency in units of GHz. The z-axis represents the signal level in an arbitrary scale. Note that since the signal level is a relative value, it takes a minus value in some cases. Further, the positions $x_{ll}$ and $x_{ul}$ in the figure respectively indicate a lower limit and an upper limit of a range for use in correcting a position $x_0$. When the position $x_0$ to be corrected is set, the lower and upper limit positions $x_{ll}$, $x_{ul}$ are respectively set to $(x_0-a)$ and $(x_0-b)$ for example, where a and b are empirically determined constants, specifically, approximately 1 m for an optical fiber of 1 km. In addition, if extension and contraction of the optical fiber is known beforehand, the lower and upper limit positions $x_{ll}$, $x_{ul}$ are not necessarily set to straddle the position $x_0$.

Next, the method of the position correction is described first with reference to FIG. 5 to FIG. 9.

Figure 5:
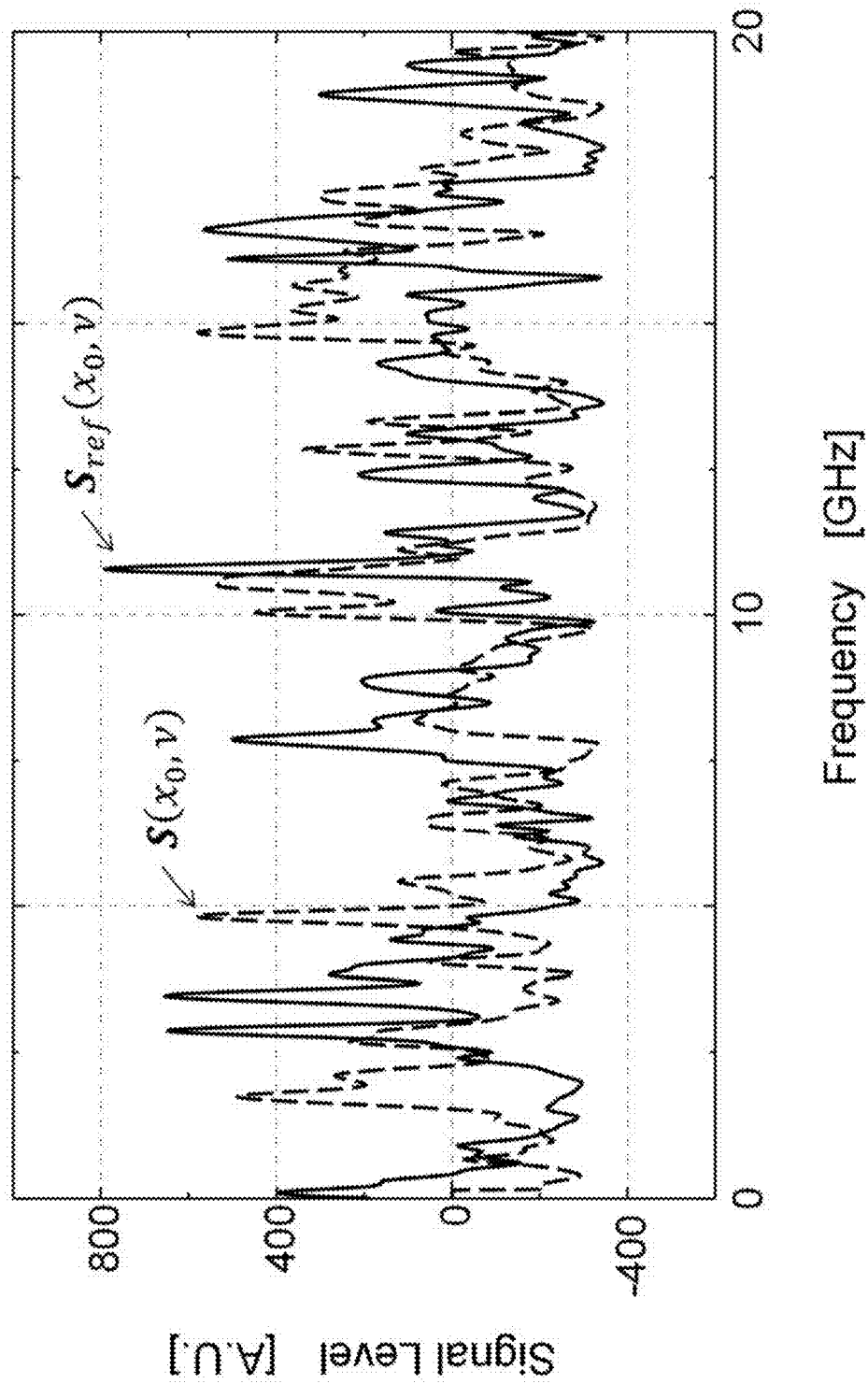
FIG. 5 is a partial detailed graph for explaining a position correcting method implemented in the Rayleigh measurement system according to Embodiment 1 of the present invention.

FIG. 5 is a graph showing the spectra on the frequency axis, of initial data and target data, specifically, represents the Rayleigh scattering spectra (RSS) on the y-axis, i.e., the frequency-axis, of the initial data and the target data at a position (distance) $x_0$. The horizontal axis is the frequency in units of GHz and the vertical axis is the signal level in an arbitrary unit, and the curves in the figure show the measured spectra. Among these curves, the curve $S_{ref}(x_0, v)$ indicated by the solid line is the initial RSS spectrum and the curve $S(x_0, v)$ indicated by the broken line is the target RSS spectrum at the measurement position $x_0$.

Figure 3:
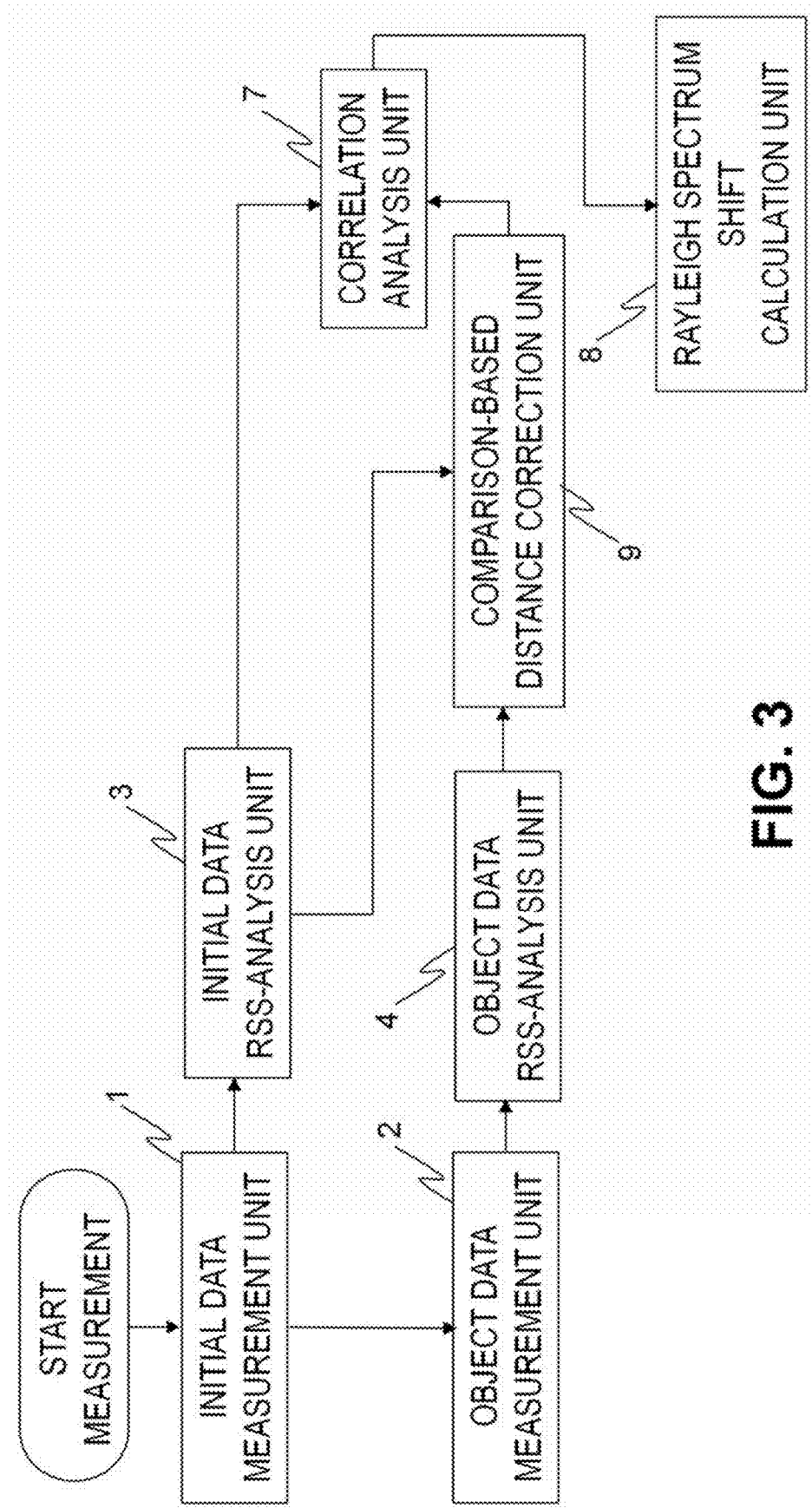
FIG. 3 is a diagram showing an example of a Rayleigh measurement system according to Embodiment 1 of the present invention.
Figure 6:
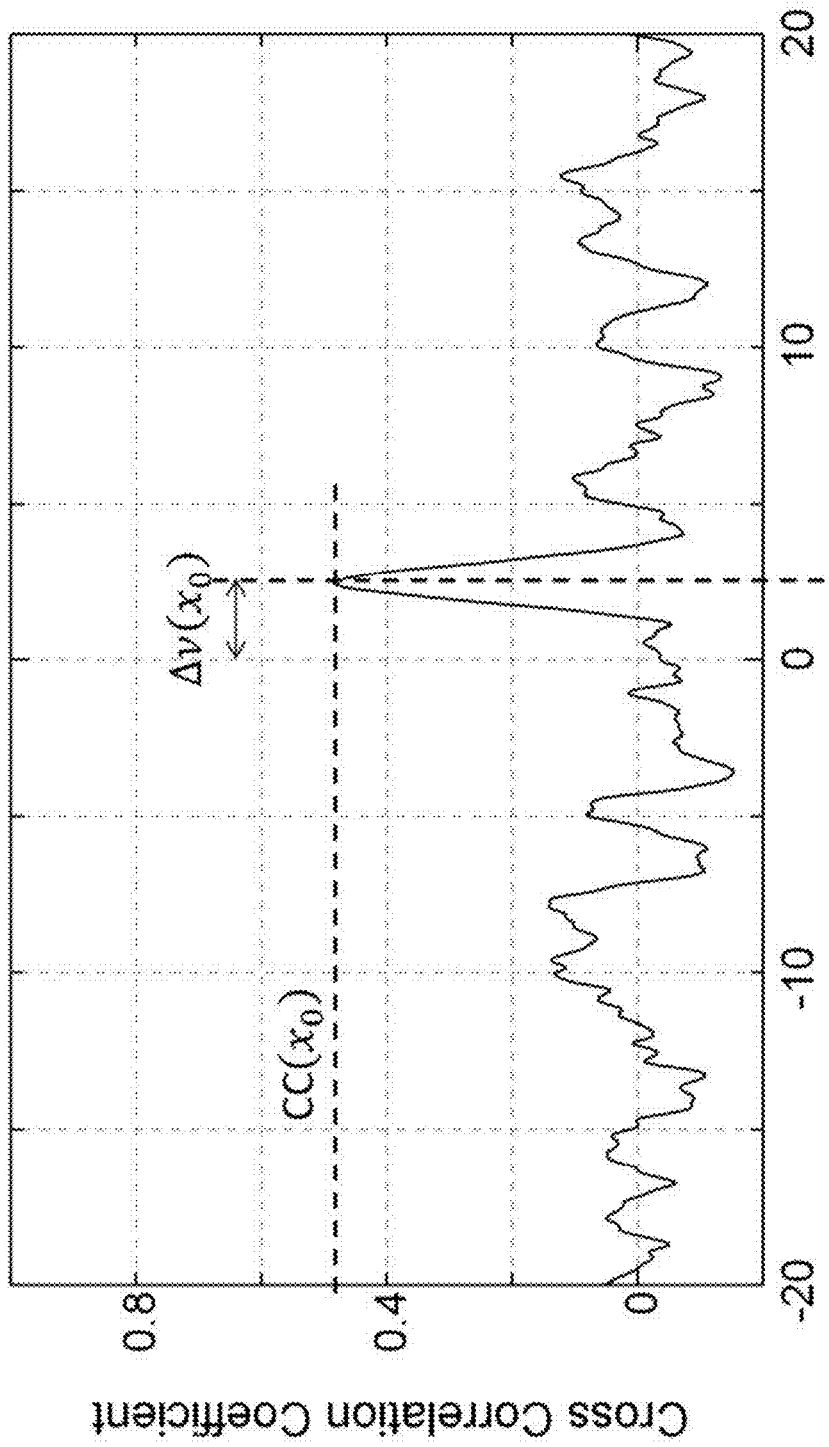
FIG. 6 is a partial detailed graph for explaining the position correcting method implemented in the Rayleigh measurement system according to Embodiment 1 of the present invention.

FIG. 6 is a graph showing the coefficient of a cross correlation between the initial RSS spectrum and the target RSS spectrum, taking the frequency shift (in units of GHz) as the horizontal axis, i.e., represents a relation between the frequency shift and the cross-correlation coefficient, taking as the vertical axis the cross-correlation coefficient obtained by the correlation analysis unit 7 shown in FIG. 3. In the figure, $CC(x_0)$ represents a maximum cross-correlation coefficient obtained and $\Delta v(x_0)$ represents a frequency shift amount when the cross-correlation coefficient becomes maximal.

Figure 7:
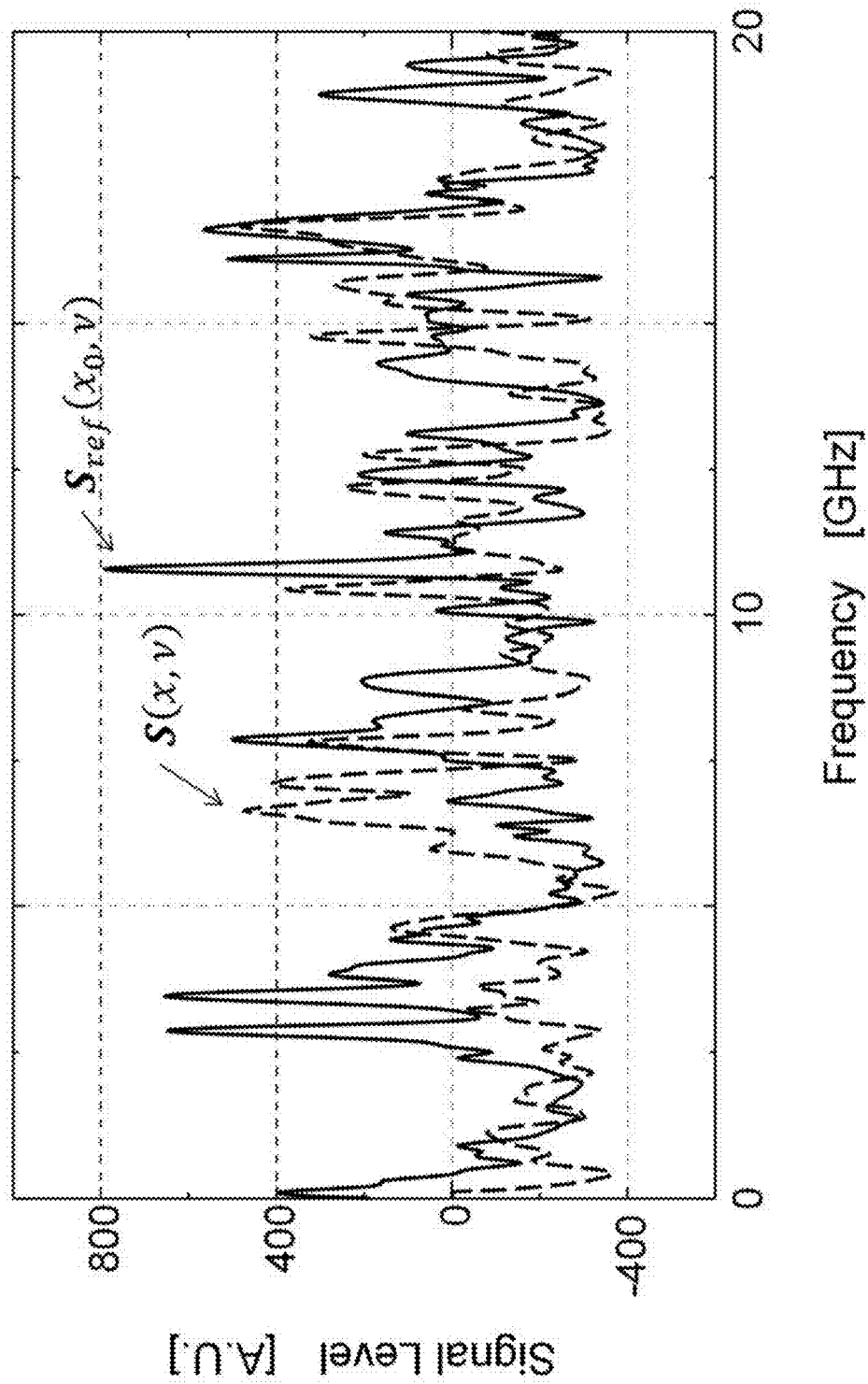
FIG. 7 is a partial detailed graph for explaining the position correcting method implemented in the Rayleigh measurement system according to Embodiment 1 of the present invention.

FIG. 7 is a graph showing the initial RSS spectrum and a target RSS spectrum when the position x is varied. That is, FIG. 7 shows the initial RSS spectrum the same as that shown in FIG. 5 and the target RSS spectrum extracted (sampled) at a position x different from the position $x_0$, taking the same coordinate axes as those of FIG. 5. In the figure, the curve $S_{ref}(x_0, v)$ indicated by the solid line is the initial RSS spectrum and the curve $S(x, v)$ indicated by the broken line is the target RSS spectrum.

Figure 8:
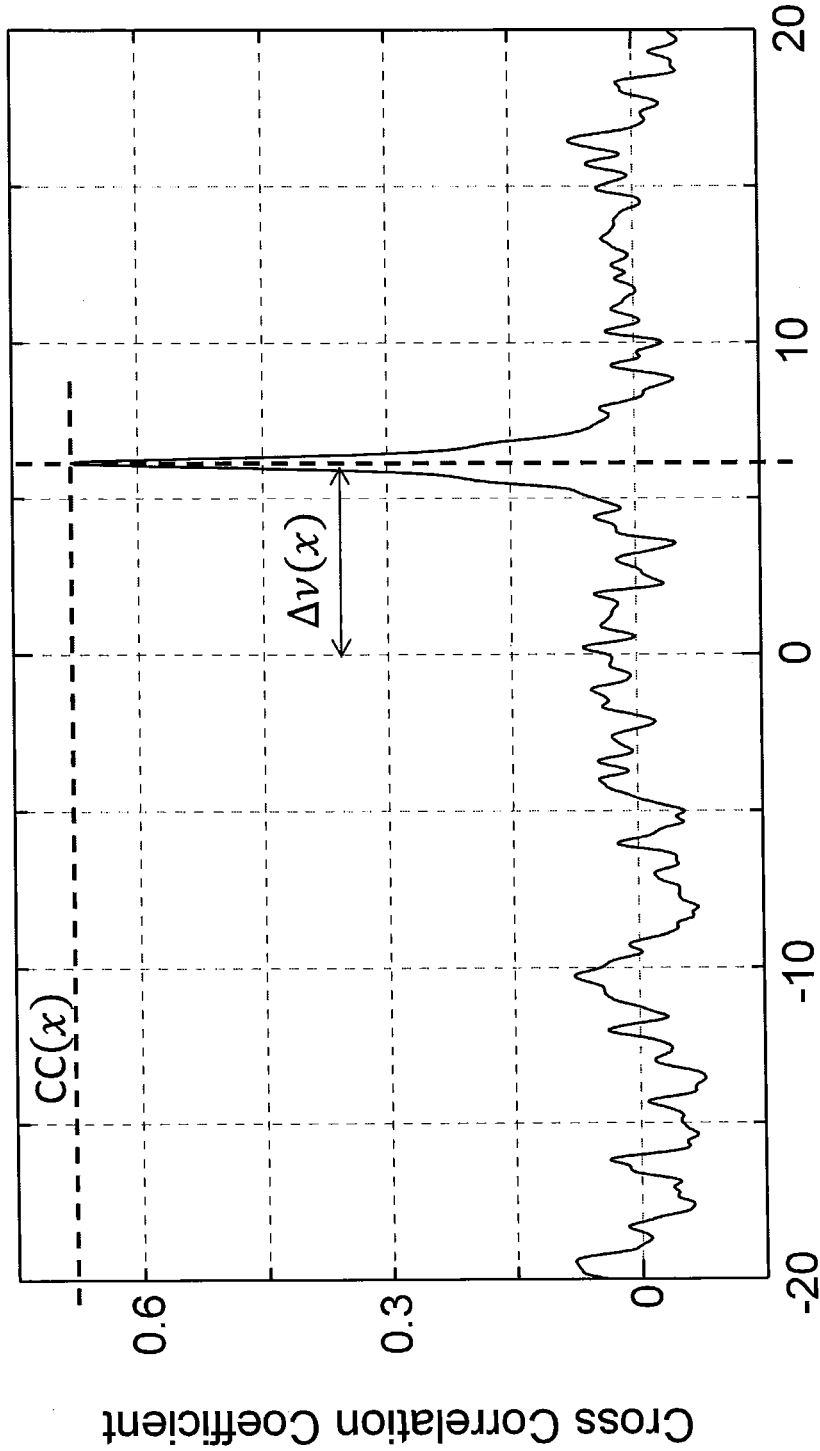
FIG. 8 is a partial detailed graph for explaining the position correcting method implemented in the Rayleigh measurement system according to Embodiment 1 of the present invention.

FIG. 8 is a graph showing a relation between the frequency shift and the cross correlation between the initial RSS spectrum and a target RSS spectrum when the position x is varied, i.e., represents a relation between a frequency shift and a cross-correlation coefficient when the target data is extracted at a position x, taking as the horizontal axis the frequency shift (in units of GHz) and as the vertical axis the cross-correlation coefficient obtained by the correlation analysis unit 7 shown in FIG. 3. In the figure, $CC(x)$ represents a maximum cross-correlation coefficient obtained and $\Delta v(x)$ represent a frequency shift amount when the cross-correlation coefficient becomes maximal.

Figure 9:
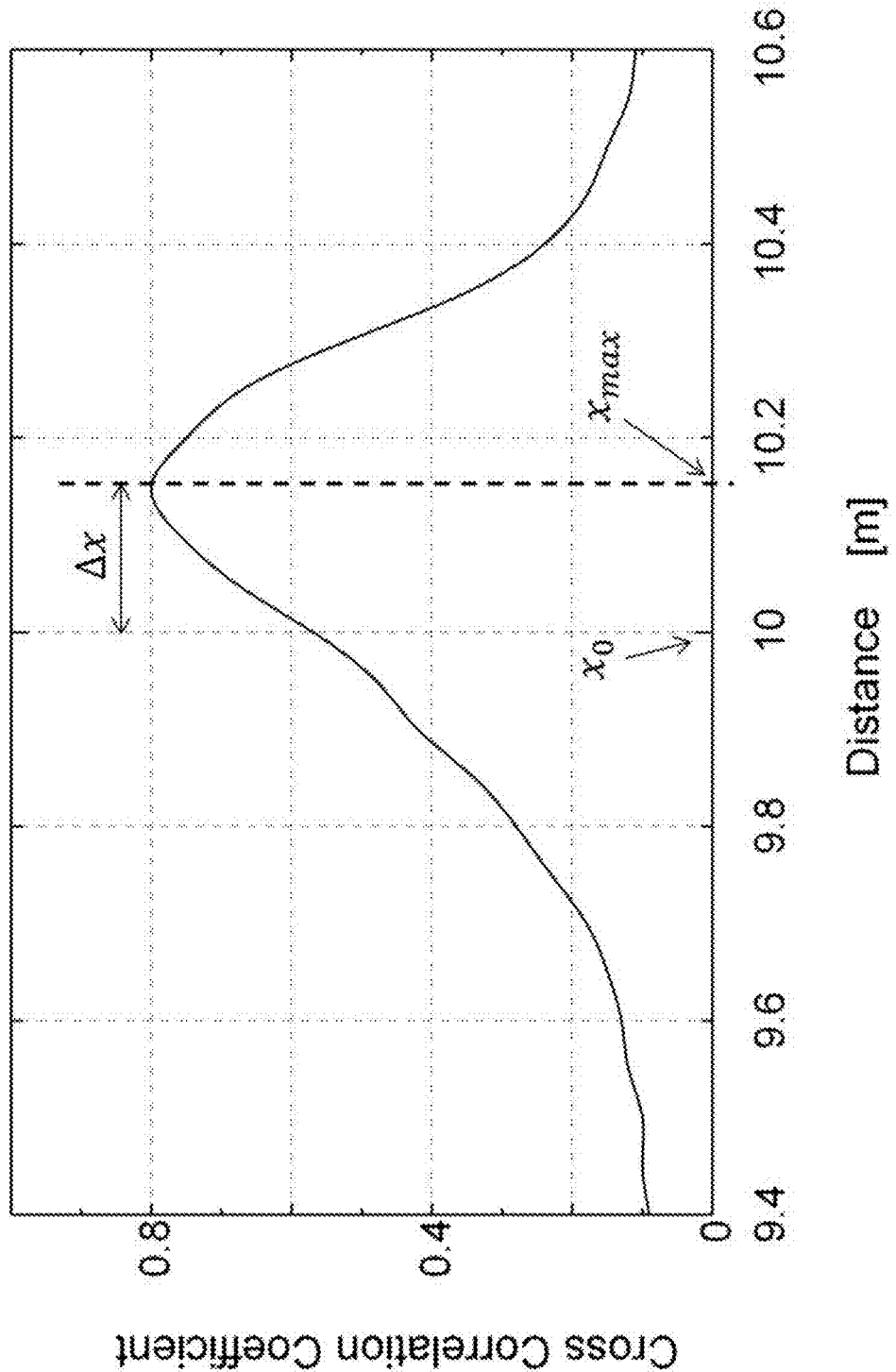
FIG. 9 is a partial detailed graph for explaining the position correcting method implemented in the Rayleigh measurement system according to Embodiment 1 of the present invention.

FIG. 9 is a graph showing a relation between maximum cross-correlation coefficients and distances, taking the position (distance) as the horizontal axis and the maximum cross-correlation coefficient as the vertical axis, in other words, representing a relation between the distance x and the maximum cross-correlation coefficient $CC(x)$ obtained as with FIG. 8. In the figure, the position $x_{max}$ is a position (distance) x at which the cross-correlation coefficient $CC(x)$ becomes maximal, and the difference $\Delta x$ between $x_{max}$ and $x_0$ is a position correction amount at the position $x_0$.

Figure 10:
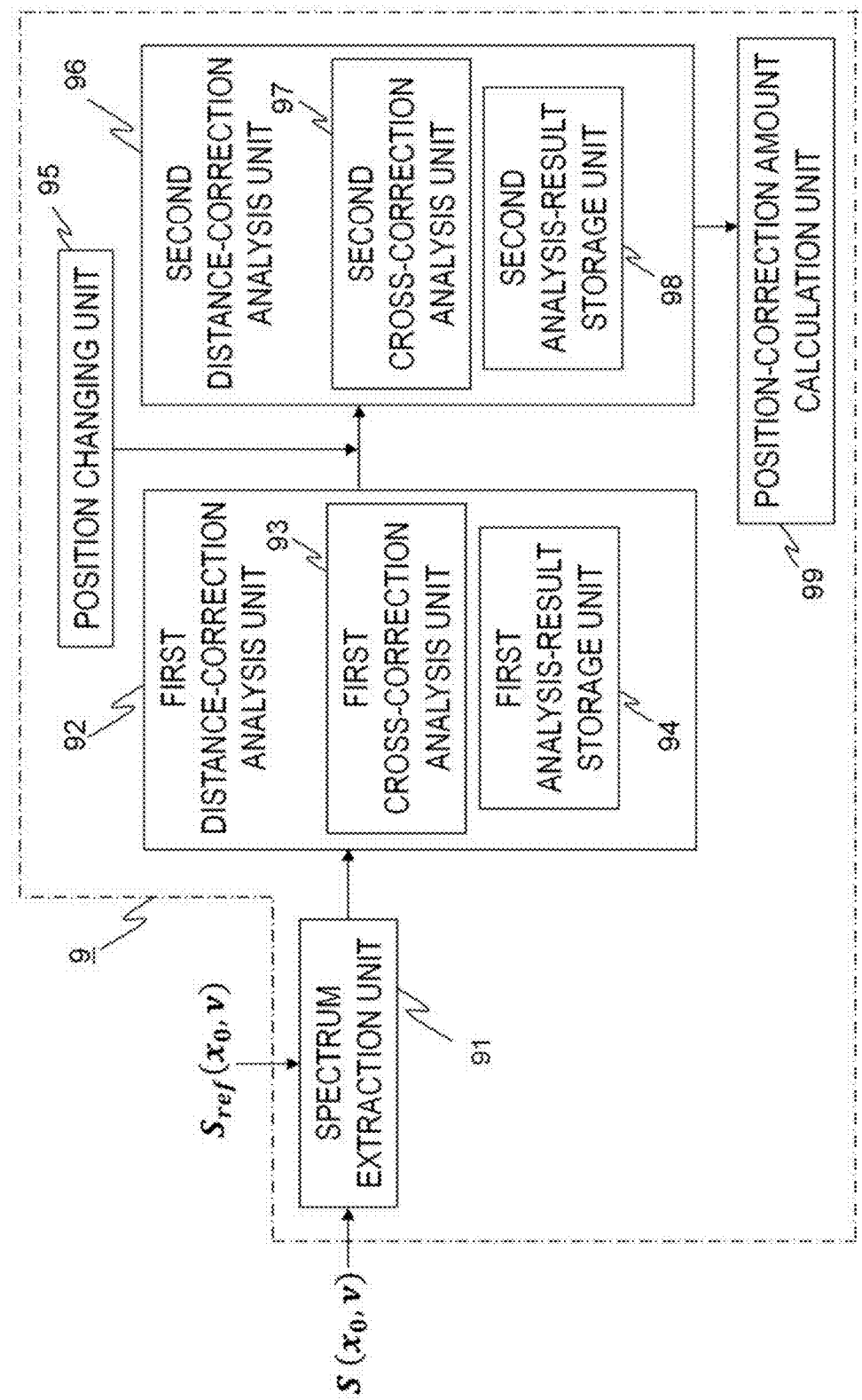
FIG. 10 is a diagram showing a detailed configuration of the comparison-based distance correction unit in FIG. 3.

The position correction (determination of the position correction amount $\Delta x$) at a given position (distance) $x_0$ in FIG. 4 is performed practically in the following order using a subsystem of FIG. 10 showing the detailed configuration of the comparison-based distance correction unit 9 of FIG. 3. In the following, the position correction is described in detail with reference to FIG. 10 and also the other figures.

(1) The position $x_0$, the lower limit position $x_{ll}$, and the upper limit position $x_{ul}$ are set on the time axis, which is the x-axis for RSS, i.e., the distance axis (see FIG. 4).

(2) The initial RSS spectrum $S_{ref}(x_0, v)$ at the position $x_0$ and the target RSS spectrum $S(x_0, v)$ thereat are extracted and these spectra are compared by a spectrum extraction unit 91 (see FIG. 10).

(3) Then, a first distance-correction analysis unit 93 in a first distance-correction analysis unit 92 calculates cross-correlation coefficient between the initial RSS spectrum $S_{ref}(x_0, v)$ and the target RSS spectrum $S(x_0, v)$ while shifting the target RSS spectrum $S(x_0, v)$ on the y-axis, i.e., on the frequency-axis, with the initial RSS spectrum $S_{ref}(x_0, v)$ being kept fixed, as shown in FIG. 5 (see FIG. 10).

(4) The cross-correlation coefficients calculated as above described in (3) by the first cross-correlation analysis unit 93 are plotted against the frequency shift amount (see FIG. 6 and FIG. 10). Then, a frequency shift amount $\Delta v(x_0)$ at which the cross-correlation coefficient becomes maximal and the maximum cross-correlation coefficient $CC(x_0)$ are stored in a first analysis-result storage unit 94 in the first distance-correction analysis unit 92 (see FIG. 10).

(5) Next, a second cross-correlation analysis unit 97 in a second distance correction analysis unit 96 performs the same calculation while shifting the target RSS spectrum $S(x, v)$ on the y-axis, i.e., the frequency-axis by changing using a position changing unit 95 the position x ($x_{ll} \le x \le x_{ul}$) for extracting the target data, with the initial RSS spectrum $S_{ref}(x_0, v)$ being kept fixed (see FIG. 7 and FIG. 10). Then, the second cross-correlation analysis unit 97 obtains a frequency shift amount $\Delta v(x)$ that maximizes the cross-correlation coefficient and obtains the maximum cross-correlation coefficient $CC(x)$ (see FIG. 8 and FIG. 10).

(6) The maximum cross-correlation coefficient $CC(x)$ is plotted against the position x, and the second cross-correlation analysis unit 97 obtains a position $x_{max}$ that maximizes $CC(x)$. Then, the position $x_{max}$ that maximizes the maximum cross-correlation coefficient and the maximum value $CC(x_{max})$ of the maximum cross-correlation coefficient at the position $x_{max}$ are stored in a second analysis-result storage unit 98 in the second distance-correction analysis unit 96 (see FIG. 10).

(7) Next, the position $x_{max}$ and the position $x_0$ input into the initial data measurement unit are input to a position-correction amount calculation unit 99, and the position-correction calculation unit 99 calculates the difference between the two positions ($\Delta x = x_{max} - x_0$), whereby the position correction amount at the position $x_0$ is determined (see FIG. 9 and FIG. 10).

In addition, $\Delta v(x_{max})$ is the Rayleigh frequency shift amount at the position $x_0$.

As described above, in the Rayleigh measurement system according to Embodiment 1, part of RSS of the initial data is extracted (the initial RSS data at the position $x_0$ is obtained) and the cross correlation between the initial RSS data and the target RSS data at a position x is calculated, with the position x being varied, whereby the relation between $\Delta x$ and the correlation value at each distance x (each position; the same applies hereafter) is obtained. And, $\Delta x$ that maximizes the correlation value is defined as an optimum $\Delta x_{opt}$. Thus, the frequency shift amount at each distance is determined by acquiring the frequency shift $\Delta v$ at the optimum $\Delta x_{opt}$.

Figure 11:
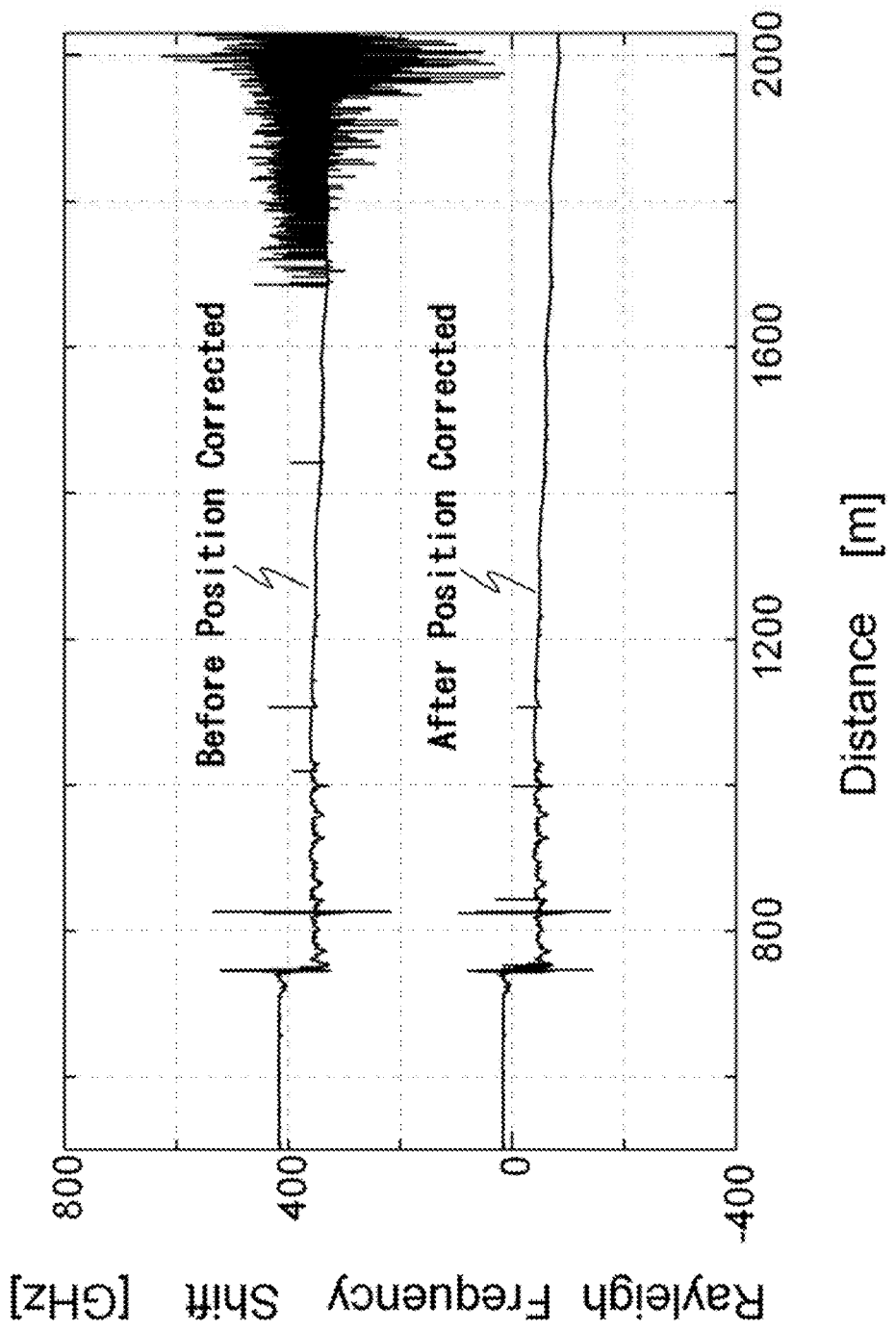
FIG. 11 is a graph showing an example of comparative data before and after position-corrected, measured with the Rayleigh measurement system according to Embodiment 1 of the present invention.

Next, a measurement example obtained by means of the system and the method described in Embodiment 1 is described hereinafter with reference to the figure FIG. 11 is a graph comparatively showing two data measured at an oil well site, taking the distance (in units of meter) as the horizontal axis and the Rayleigh frequency shift (in units of GHz) as the vertical axis. The upper waveform vibrating upwardly and downwardly around the amplitude center at about 400 GHz is Rayleigh frequency-shift data before position-corrected and the lower waveform vibrating upwardly and downwardly around the center at about 0 GHz is Rayleigh frequency-shift data after position-corrected. The large vibration of the waveform of the data before position-corrected occurring in the range over the distance of 1,700 m is due to the fact that the correlation analysis cannot be properly performed owing to distance deviation.

In the figure, although the Rayleigh frequency shift partly vary at the positions ranging from 800 m to 1,100 m, the lower Rayleigh frequency-shift data after position-corrected exhibits, on the whole, no variation at many positions ranging particularly over 1,100 m and has substantially a constant value, comparing to the upper data before position-corrected. This shows that the data after position-corrected is significantly improved compared to a conventional measurement and a desirable result can be obtained.

Further, a measurement example obtained using another optical fiber and by means of the system and the method described in Embodiment 1 is described hereinafter with reference to the figure.

Figure 12:
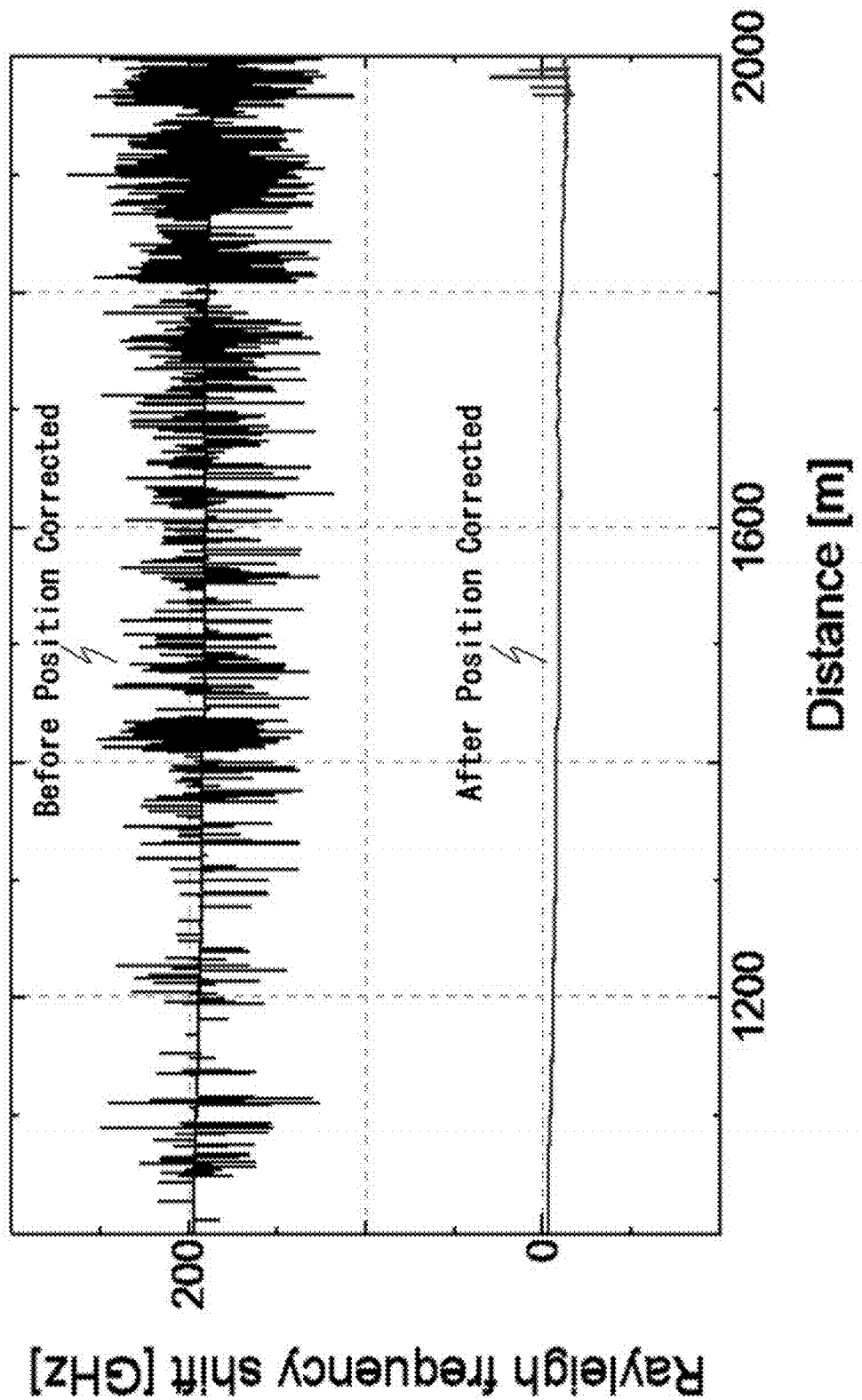
FIG. 12 is a graph showing another example of comparative data before and after position-corrected, measured with using the Rayleigh measurement system according to Embodiment 1 of the present invention.

FIG. 12 is a graph comparatively showing two data measured using another optical fiber different from that used in the example shown in FIG. 11, taking the horizontal axis and the vertical axis as with FIG. 11. The upper waveform vibrating upwardly and downwardly around the amplitude center at about 200 GHz is Rayleigh frequency-shift data before position corrected and the lower waveform vibrating upwardly and downwardly around the center at about 0 GHz is Rayleigh frequency-shift data after position corrected. In the data before position corrected, the data points increase at which the correlation analysis cannot be properly performed owing to significant influence of the distance deviation as increasing distance to measurement positions over 1,000 m.

In the case shown in the figure, the Rayleigh frequency-shift data after position-corrected exhibits no variation and has substantially constant values at positions ranging particularly from 1,000 m to 1,900 m, comparing to the data before position-corrected. This shows that the data after position corrected is significantly improved compared to a conventional measurement and a desirable result can be obtained.

As described above, it is found that the Rayleigh measurement system according to Embodiment 1 offers the advantage of enabling a Rayleigh frequency shift to be measured as a constant value without variation, in other words, of enabling stress and other physical quantities of a measurement target to be measured with high accuracy also in a long measurement range more than several hundred meters, compared to a conventional measurement system using Rayleigh backscattering alone and having no position-correction function. It should be noted that the embodiment of the present invention may be appropriately modified or omitted within the spirit and the scope of the invention.

Figure 13:
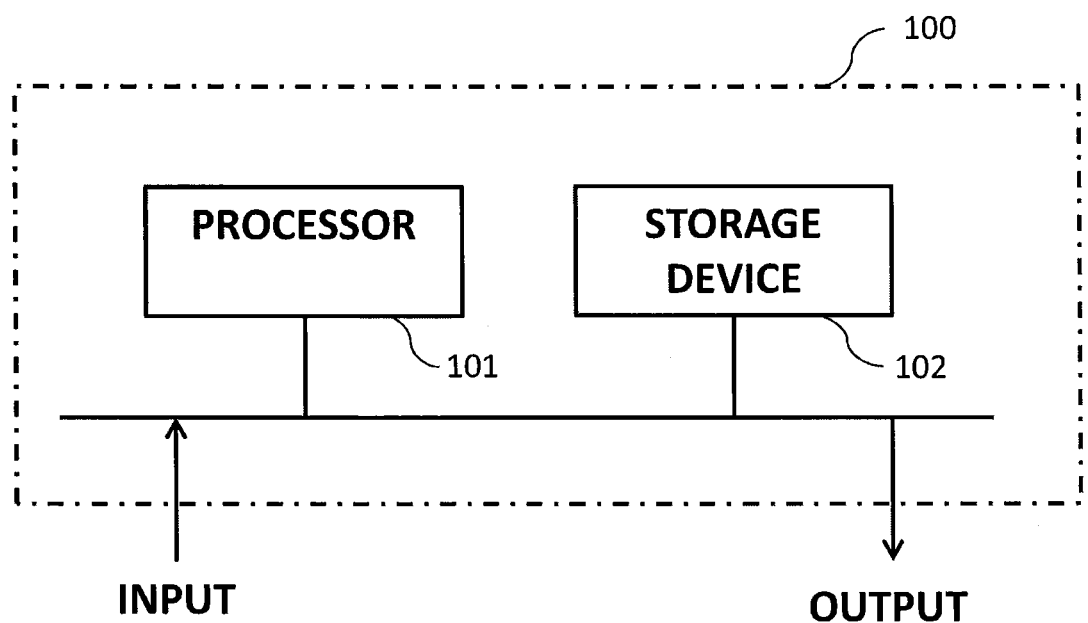
FIG. 13 is a diagram showing an example of hardware of the processing apparatus.

FIG. 13 shows an example of hardware of the processing apparatus 100. The processing apparatus 100 is composed of a processor 101 and a storage device 102 as shown in FIG. 13. The storage device 102 includes, although not shown, a volatile storage device such as a random access memory, and a nonvolatile auxiliary storage device such as a flash memory. The storage device 102 may include, instead of a flash memory, an auxiliary storage device such as a hard disk. The processor 101 executes a program loaded from the storage device 102. In this case, the program is loaded from the auxiliary storage device to the processor 101 via the volatile storage device. The processor 101 may output data of the calculation result and the like to the volatile storage device of the storage device 102, or may store the data in the auxiliary storage device via the volatile storage device.

NUMERAL REFERENCES

1: initial data measurement unit;
2: target data measurement unit;
3: initial RSS analysis unit;
4: target RSS analysis unit;
7: correlation analysis unit;
8: Rayleigh spectrum shift calculation unit;
9: comparison-based distance correction unit;
91: spectrum extraction unit;
92: first distance-correction analysis unit;
93: first cross-correction analysis unit;
94: first analysis-result storage unit;
95: position changing unit;
96: second distance-correction analysis unit;
97: second cross-correction analysis unit;
98: second analysis-result storage unit;
99: position-correction amount calculation unit;
100: processing apparatus;
101: processor; and
102: storage device.

The invention claimed is:

1. A Rayleigh measurement system configured to obtain a distribution of a physical quantity of an optical fiber, on the basis of Rayleigh backscattering light produced by launching optical pulses into the optical fiber, the Rayleigh measurement system comprising:
    an initial data measurement unit configured to measure Rayleigh backscattering light from the optical fiber, to obtain initial data as a reference for a distance correction;
    a target data measurement unit configured to measure Rayleigh backscattering light from the optical fiber, to obtain target data to be distance-corrected by the distance correction;
    an initial Rayleigh-scattering spectrum analysis unit configured to frequency-analyze the initial data measured with the initial data measurement unit, to obtain an initial Rayleigh-scattering spectrum;
    a target Rayleigh-scattering spectrum analysis unit configured to frequency-analyze the target data measured with the target data measurement unit, to obtain a target Rayleigh-scattering spectrum;
    a comparison-based distance correction unit configured to perform the distance correction by comparing the initial Rayleigh-scattering spectrum obtained by the initial Rayleigh-scattering spectrum analysis unit with the target Rayleigh-scattering spectrum obtained by the target Rayleigh-scattering spectrum analysis unit, to correct distance error at a measurement position in the target Rayleigh-scattering spectrum obtained by the target Rayleigh-scattering spectrum analysis unit;
    a correlation analysis unit configured to obtain correlation analysis data by performing a correlation analysis between the initial Rayleigh-scattering spectrum obtained by the initial Rayleigh-scattering spectrum analysis unit and the target Rayleigh-scattering spectrum whose distance error is corrected by the comparison-based distance correction unit; and
    a Rayleigh spectrum shift calculation unit configured to calculate a Rayleigh spectrum shift, on the basis of the correlation analysis data obtained by the correlation analysis unit, to determine a Rayleigh spectrum shift amount at the measurement position along the optical fiber.

2. The Rayleigh measurement of claim 1, wherein the comparison-based distance correction unit includes
    a spectrum extraction unit configured to extract Rayleigh scattering spectra of the initial data and the target data at a predetermined initial position;
    a first distance-correction analysis unit configured to analyze the initial Rayleigh-scattering spectrum and the target Rayleigh-scattering spectrum, to calculate a maximum cross-correlation coefficient and a frequency shift amount at the initial position;
    a position changing unit configured to set in advance predetermined an upper limit and a lower limit with respect to the initial position, and to change a position for extracting the target Rayleigh-scattering spectrum between the upper limit and the lower limit;
    a second distance-correction analysis unit configured to analyzing the initial Rayleigh-scattering spectrum and a target Rayleigh-scattering spectrum at the position for extracting the target Rayleigh-scattering spectrum every time when the position changing unit changes the position for the target Rayleigh-scattering spectrum between the upper limit and the lower limit,
    to calculate a maximum cross-correlation coefficient and a frequency shiamount at each position for extracting the target Rayleigh-scattering spectrum, and to determine a position that maximizes the maximum cross-correlation coefficient at each changed positions; and
    a position-correction amount calculation unit configured to determine a position correction amount at the initial position from a difference between the initial position and a position that maximizes the maximum cross-correlation coefficient obtained by the second distance-correction analysis unit.

3. The Rayleigh measurement of claim 2, wherein the first distance correction analysis unit includes
    a first cross-correlation analysis unit configured to analyze a cross-correlation coefficient between the initial Rayleigh-scattering spectrum at the initial position and the target Rayleigh-scattering spectrum at the initial position; and
    a first analysis result storage unit configured to store the analysis result of the first cross-correlation analysis unit, and
the second distance-correction analysis unit includes
    a second cross-correlation analysis unit configured to analyze the initial Rayleigh-scattering spectrum and a target Rayleigh-scattering spectrum at the position for extracting the Rayleigh scattering spectrum, and to analyze a maximum cross-correlation coefficient when the position for extracting the target data is changed; and
    a second analysis-result storage unit configured to store the analysis result of the second cross-correlation analysis unit.

4. A Rayleigh measurement method of obtaining a distribution of a physical quantity of an optical fiber, on the basis of Rayleigh scattering light produced by launching light pulses into the optical fiber, the Rayleigh measurement method comprising the steps of:

analyzing initial data, which is a reference for a distance correction, of the Rayleigh backscattering light from the optical fiber, to obtain an initial Rayleigh-scattering spectrum;

analyzing target data, which is to be distance-corrected by the distance correction, of Rayleigh backscattering light from the optical fiber, to obtain a target Rayleigh-scattering spectrum;

performing the distance correction of the target Rayleigh-scattering spectrum by comparing the initial Rayleigh-scattering spectrum and the target Rayleigh-scattering spectrum, to obtain a distance-corrected spectrum; and performing correlation analysis between the distance-corrected spectrum and the initial Rayleigh-scattering spectrum, to determine a Rayleigh spectrum shift amount at a measurement position along the optical fiber.

5. The Rayleigh measurement method of claim 4, further comprising the steps of:

analyzing a signal level of the Rayleigh scattering spectrum on a distance-frequency coordinate plane;

setting a given position to perform the distance correction, and setting two different positions with respect to the given position to provide between the two different positions a position range for performing the distance correction;

extracting respective Rayleigh scattering spectra at the given position from of the initial and the target Rayleigh-scattering spectra;

analyzing a first cross-correlation coefficient between the initial Rayleigh-scattering spectrum at the given position and the target Rayleigh-scattering spectrum at the given position while shifting on the frequency axis the target Rayleigh-scattering spectrum, with the initial Rayleigh-scattering spectrum at the given position being kept fixed;

storing a frequency shift amount that maximizes the first cross-correlation coefficient obtained by the analysis and the maximum cross-correlation coefficient;

subsequently changing, between the two different positions, the position at which the target Rayleigh-scattering spectrum is extracted;

analyzing a second cross-correlation coefficient between the initial Rayleigh-scattering spectrum at the given position and a target Rayleigh-scattering spectrum at each changed position; and obtaining a frequency shift amount that maximizes the maximum second cross-correlation coefficient obtained by the analysis and the maximum second cross-correlation coefficient, and obtaining a position that maximizes the maximum second cross-correlation coefficient obtained at each changed position, to determine from the obtained position a position correction amount at the given position.

6. The Rayleigh measurement method of claim 5, wherein the position correction amount at the given position is determined from a difference between the given position and a position that maximizes the maximum second cross-correlation coefficients.

* * * * *